United States Patent [19]

Hergenrother et al.

[11] 4,218,557
[45] Aug. 19, 1980

[54] POLYPHOSPHAZENE POLYMERS CONTAINING N-SUBSTITUTED AMIDO AND IMIDO SUBSTITUENTS

[75] Inventors: William L. Hergenrother, Akron; Adel F. Halasa, Bath, both of Ohio

[73] Assignee: The Firestone Tire & Rubber Company, Akron, Ohio

[21] Appl. No.: 953,718

[22] Filed: Oct. 20, 1978

[51] Int. Cl.$^2$ ............... C08G 83/00; C08G 73/00
[52] U.S. Cl. ............... 528/168; 528/315; 528/321; 528/363; 528/323; 528/399
[58] Field of Search ............ 528/315, 399, 168, 321, 528/323

[56] References Cited

U.S. PATENT DOCUMENTS 3,893,980  7/1975  Allcock et al. ............... 260/29.2 N

FOREIGN PATENT DOCUMENTS 568594  4/1945  United Kingdom .................. 528/399

*Primary Examiner*—Wilbert J. Briggs, Sr.

[57] ABSTRACT

Polyphosphazene polymers are prepared which contain repeating units represented by the formulas:

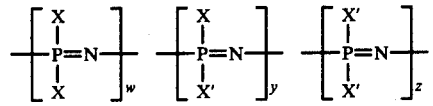

wherein X is represented by:

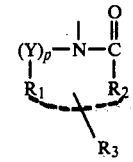

wherein Y is selected from the group consisting of

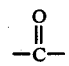

and —SO$_2$— and p=0 or 1; when p=0, R$_1$ and R$_2$ are independently selected from a group consisting of substituted or unsubstituted aliphatic, aryl, araryl, and alkylaryl radicals or R$_1$ and R$_2$ can form a cyclic amide containing radical wherein R$_1$ and R$_2$ taken together are selected from a group consisting of -(-CH$_2$)$_n$ where n=2 to 12, wherein R$_3$ is a lower alkyl radical or hydrogen; and when p=1, R$_1$ and R$_2$ taken together form a linkage in a cyclic imide containing radical selected from a group consisting of -(-CH$_2$)$_{n'}$ where n'=2 or 3 and

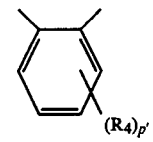

where R$_3$ is as defined above, R$_4$ is selected from the group consisting of hydrogen, halogen and alkyl radical containing 1 to 6 carbon atoms; and p' is 0 to 4, X' is a substituted or unsubstituted alkoxy, aryloxy, amino or mercapto substituent group or mixtures thereof which are compatible with an N-substituted amido substituent and are known in the state of the art of polyphosphazene technology; and 20≦(w+y+z)≦ 50,000 per polymer and (y+z)>0.

The polymers of the invention can be utilized to form protective films and can also be utilized in applications such as for molding, coatings, foams and the like.

10 Claims, No Drawings

POLYPHOSPHAZENE POLYMERS CONTAINING N-SUBSTITUTED AMIDO AND IMIDO SUBSTITUENTS

BACKGROUND OF THE INVENTION

Polyphosphazene polymers containing repeating

units in which various substituted and unsubstituted alkoxy, aryloxy, amino and mercapto groups are attached to the phosphorus atom and their method of preparation are described in the prior art as illustrated in the publication "Nitrogen-Phosphorus Compounds," Academic Press, New York, N.Y., 1972 by H. R. Allcock and "Poly(Organophosphazenes)," Chemtech, Sept. 19, 1975, by H. R. Allcock and in such U.S. Pat. Nos. 3,515,688; 3,702,833; 3,856,712; 3,974,242; and 4,042,561; the disclosures of which are herein incorporated by reference.

However, none of the aforementioned publications and patents or for that matter, none of the prior art of which applicants are aware, discloses or suggests polyphosphazene copolymers containing N-substituted amido or imido substituents attached to the phosphorus atom or methods of preparing such polymers.

SUMMARY OF THE INVENTION

This invention relates to polyphosphazene copolymers containing repeating

units in the polymer chain in which N-substituted amido or imido substituents are attached to the phosphorus atom. More particularly, the invention relates to polyphosphazene polymers having substituents derived from a N-substituted amide or a cyclic imide which are attached to the phosphorus atom and to a method of preparing such polymers. Any substituent groups such as alkoxy, aryloxy, amino and mercapto groups which are known in the polyphosphazene state of the art can be substituted onto the polyphosphazene in addition to the N-substituted amido and imido substituents. These substituents may be substituted onto the polyphosphazene by the method disclosed in the present invention or by prior art methods.

DETAILED DESCRIPTION OF THE INVENTION

The polymers of the invention contain repeating units represented by the formulas:

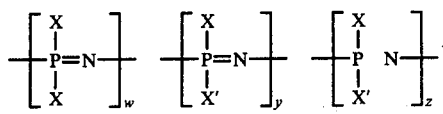

wherein X is represented by:

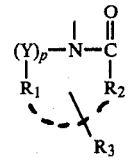

wherein Y is selected from the group consisting of

and $-SO_2-$ and $p=0$ or 1; when $p=0$, $R_1$ and $R_2$ are independently selected from a group consisting of substituted or unsubstituted aliphatic, aryl, araryl, and alkylaryl radicals or $R_1$ and $R_2$ can form a cyclic amide containing radical wherein $R_1$ and $R_2$ taken together are selected from a group consisting of $(CH_2)_n$ where $n=2$ to 12, wherein $R_3$ is a lower alkyl radical or hydrogen; and when $p=1$, $R_1$ and $R_2$ taken together form a linkage in a cyclic imide containing radical selected from a group consisting of $(CH_2)_{n'}$, wherein $n'=2$ or 3 and

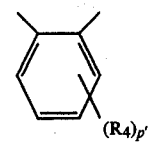

wherein $R_3$ is as defined above, $R_4$ is selected from the group consisting of hydrogen, halogen and alkyl radical containing 1 to 6 carbon atoms and p' is 0 to 4, X' is a substituted or unsubstituted alkoxy, aryloxy, amino or mercapto substituent group or mixtures thereof which are compatible with an N-substituted amido substituent and are known in the state of the art of polyphosphazene technology; and $20 \leq (w+y+z) \leq 50,000$ per polymer and $(y+z) > 0$. The substitution on the various substituted groups may be any "non-reactive" substituent, i.e., a substituent which is non-reactive with the various materials present during polymer formation. Suitable substituents include chlorine, bromine, nitro, cyano, phenoxy, alkoxy and the like.

In the polymer units represented by the above formulas, all X substituent groups can be the same or they can be mixed and all X' substituent groups can be the same or mixed. In the mixtures, the X substituent groups can be mixtures of different N-substituted amido groups of different imido groups or a mixture of amido and imido groups and the X' substituent groups can be mixtures of alkoxy, aryloxy, amino and mercapto groups.

The phosphazene polymers of the invention can be represented by the formula:

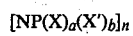

wherein n' is from 20 to 50,000 and $a+b=2$, and a and b are greater than zero.

The specific proportion of X to X' substituent groups incorporated in the copolymers of the invention can vary considerably depending upon chemical and physical properties desired in the copolymer and the particular end use application for which the copolymer is intended. Thus, for applications such as moldings, coatings, foams, and the like, the copolymer should contain at least ten mole percent of the X substituent.

The homopolymer, that is, where all substituent groups on the polyphosphazene polymer are N-substituted amide or cyclic imide derivatives, cannot be prepared by the method of the present invention or by prior art methods. The polyphosphazene copolymer can contain N-substituted amide and imide derivatives in up to about 80% of the total possible substitution sites. It is very difficult to substitute a higher percentage of the possible site due to steric hindrance in substitution of the N-substituted amide and imide derivatives.

An advantage in the substitution of a N-substituted amido or imido substituent onto the polyphosphazene polymer is that, depending on the selection of the $R_1$ and $R_2$ substituted groups, the substitutions will impart low temperature flexibility and solvent resistance to the polyphosphazene polymer produced.

The term polymer herein includes within its meaning copolymer, that is, polymer units containing more than one substituent in a non-repeating manner.

The polymers can be used to prepare protective films and may be utilized in applications such as moldings, foams, coatings, and the like.

METHOD OF PREPARATION

The polymers are prepared by reacting a poly(dichlorophosphazene) having the formula $—(NPCl_2)_{n'}—$, in which n' is from 20 to 50,000, in the presence of a tertiary amine with a mixture of a N-substituted amide or a cyclic imide with any compound which is reactive with the poly(dichlorophosphazene) to form a substitution group on a phosphorus atom in the poly(dichlorophosphazene) which is known in the state of the art. Examples of such compounds are discussed in the section entitled "Additional Reactive Compounds" below.

I. THE POLY(DICHLOROPHOSPHAZENE) POLYMER

Poly(dichlorophosphazene) polymers which are employed as starting materials in the process of this invention are well known in the art as illustrated in U.S. Pat. Nos. 3,370,020; 4,005,171; and 4,055,520 and the aforementioned publications of H. R. Allcock, the disclosures of which are incorporated herein by reference.

These polymers have the general formula $—(NPCl_2)_{n'}—$ in which n may range from 20 to 50,000 or more. As described in the aforementioned references, the polymers are in general prepared by the thermal polymerization of cyclic oligomers having the formula $(NPCl_2)_m$ in which m is an integer from 3 to 7, with the cyclic trimer and tetramer often comprising up to 90% of the oligomers and the ratio of trimer to tetramer varying with the method of manufacture.

The specific conditions of temperature, pressure and time employed in the thermal polymerization of the cyclic oligomers can vary considerably depending on whether or not the polymerization is catalyzed. Thus, temperatures may range from about 130° C. to about 300° C., pressure may range from a vacuum of less than about $10^{-1}$ Torr to superatmospheric and times may range from 30 minutes to about 48 hours.

A preferred process for preparing the poly(dichlorophosphazene) polymers used in the process of this invention is described in the aforementioned incorporated U.S. Pat. No. 4,005,171.

II. N-SUBSTITUTED AMIDES AND IMIDES WHICH MAY BE USED TO FORM THE POLYMERS OF THE INVENTION

The N-substituted amides which are used to form the polymers of the invention can be represented by the following formula where p=0.

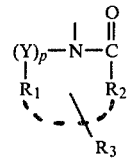

wherein $R_1$ and $R_2$ are independently selected from a group consisting of substituted or unsubstituted aliphatic, cycloaliphatic, aryl, araryl, and alkylaryl radicals; or $R_1$ and $R_2$ can form a cyclic amide containing radical wherein $R_1$ and $R_2$ taken together are selected from a group consisting of $-(CH_2)_n-$, wherein n=2 to 12, wherein $R_3$ is a lower alkyl radical or hydrogen.

N-substituted amides which are employed in producing the polymers of the invention are amides which contain a secondary nitrogen in the amide group and can be substituted with aliphatic, cycloaliphatic, aryl, araryl, alkylaryl, or heterocyclic radicals which may be substituted or unsubstituted with halogen, alkoxy, lower alkyl, or aryloxy radicals. The secondary nitrogen containing amide can be part of a cyclic ring containing only carbon atoms in addition to the amide such as caprolactam.

Illustrative examples of N-substituted amide containing aliphatic, aryl, and heterocyclic groups which can be employed are N-phenylacetamide (acetanilide); o-, p-, m-nitroacetanilide; aceto-o, p, or m-toluidide; N-benzylacetamide (benzanilide); N-ethylacetamide; N-acetyl-naphthyl amine; N-phenylbenzamide; N-phenylbutyramide; N-cyclohexylbutyramide; N-butylbutyramide; N-(4-acetylphenyl)acetamide; N-(2-, 3-, or 4-bromophenyl)acetamide; N-(4-butylphenyl)-acetamide; N-(2-chloro-4-nitrophenyl)acetamide; N-(5-ethoxy-2-nitrophenyl)acetamide; N-(4-octylphenyl)acetamide; N-furfuryl-α-chloroacetamide; N-tetrahydrofurfuryl-α-chloroacetamide; 5-benzamido-8-ethoxy-quinoline (amalgen), and the like.

Illustrative cyclic N-substituted amides include caprolactam and 3-, 4-, 5-, or 6-methyl caprolactam.

Preferred N-substituted amides for the preparation of the polymers of the invention are caprolactam and acetanilide.

Active hydrogen containing imides which are employed in producing the polymers of the invention are cyclic imides including sulfimides such as saccharin, which contain a secondary nitrogen in the imide group which will attach to a phosphorus atom in the polyphosphazene backbone. These imides are represented by the above structural formula when p=1, Y is selected from the group consisting of

and $—SO_2—$, $R_1$ and $R_2$ taken together form a linkage selected from the group consisting of $-(CH_2)_{n'}-$, where n'=2 or 3, and

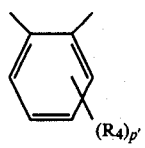

where $R_3$ is a lower alkyl radical or hydrogen, $R_4$ is selected from a group consisting of hydrogen, halogen and alkyl radicals containing 1 to 6 carbon atoms and p' is 0 to 4.

Illustrative examples of the cyclic imides include phthalimide, succinimide, glutarimide, 3-oxo-2,3-dihydrobenz[d]-isothiazole-1,1-dioxide (saccharin), as well as their substituted derivatives such as tetrahydrophthalimide; 3,4,5,6-trichlorophthalimide; 3-methyl phthalimide; 2-methyl-glutarimide; 2-methyl-3-pentyl-glutarimide; and the like.

The preferred imides for the preparation of the polymers of the invention are phthalimide and saccharin.

III. ADDITIONAL REACTIVE COMPOUNDS

As indicated heretofore, the polyphosphazene copolymers of the invention in addition to the N-substituted amido or imido substituent groups contain substituted or unsubstituted alkoxy, aryloxy, amino or mercapto groups or mixtures thereof.

Preferred substituent groups represented by X' for use in these copolymers are:

Alkoxy groups (substituted or unsubstituted) derived from aliphatic alcohols having from 1 to 20 carbon atoms such as methanol, ethanol, propanol, isopropanol, n-butanol, sec-butanol, hexanol, dodecanol and the like; fluoroalcohols, especially those represented by the formula $Z(CF_2)_nCH_2OH$ in which Z is hydrogen or fluorine and n is an integer from 1 to 10 as illustrated by trifluoroethanol; 2,2,3,3,3-pentafluoropropanol; 2,2,3,3,4,4,4-heptafluorobutanol; 2,2,3,3-tetrafluoropropanol; 2,2,3,3,4,4,5,5-octafluoropentanol; 2,2,3,3,4,4,5,5,6,6,7,7-dodecafluoroheptanol and the like. In instances where it is desired to incorporate mixed X' substituent groups in the copolymers, mixtures of the foregoing alcohols may be employed.

Aryloxy groups (substituted or unsubstituted) derived from aromatic alcohols including among others phenol; alkylphenols such as cresols, xylenols, p-, o-, and m-ethyl and propyl phenols and the like; halogen-substituted phenols such as p-, o-, and m-chloro and bromo phenols and di- or tri-halogen substituted phenols and the like; and alkoxy-substituted phenols such as 4-methoxyphenol; 4-(n-butoxy) phenol and the like. Mixtures of the foregoing aromatic alcohols can also be employed.

Amino groups derived from any of the amino compounds heretofore employed in the polyphosphazene polymer art. Thus, the amino groups can be derived from aliphatic primary and secondary amines such as methylamine, ethylamine, dimethylamine, ethylmethylamine and the like and aromatic amines such as those described in U.S. Pat. No. 4,042,561 (hereby incorporated by reference) as illustrated by aniline, halogen-substituted anilines, alkyl-substituted anilines, alkoxy-substituted anilines and the like.

Mercapto groups derived from any of the mercaptan compounds heretofore employed in the polyphosphazene polymer art. Thus, for example, the mercaptan compounds described in U.S. Pat. No. 3,974,242 to Lanier et al (hereby incorporated by reference) can be utilized. Representative of suitable mercaptan compounds as described in the aforementioned patent are methyl mercaptan and its homologs ethyl, propyl, butyl, aryl and hexyl mercaptan, thiophenol, thionaphthols, benzyl mercaptan, cyclohexyl mercaptan and the like.

IV. THE THERTIARY AMINE

The use of tertiary amine in preparing the polymers of the invention minimizes undesirable side reactions and at the same time acts as an effective acid scavenger.

Tertiary amine which can be employed in preparing the polymers of the invention are those represented by the general structure:

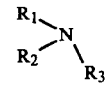

wherein $R_1$, $R_2$, and $R_3$ can each be alkyl containing from 1 to 8 carbon atoms. Thus, for example, the tertiary amine can be a trialkyl amine such as trimethylamine, triethylamine, tri-isopropylamine, tri-n-propylamine, tri-isobutylamine, tri-n-butylamine and the like. In addition, tertiary amines such as pyridine and those containing diamine groups such as N,N,N',N'-tetramethylethylene diamine (TMEDA) can also be utilized.

The preferred tertiary amines for use in preparing the polymers of the invention are triethylamine; N,N,N',N'-tetramethylethylene diamine; pyridine, N-methyl morpholine; N-methyl pyrrole; 1,4-diaza-bicyclo (2.2.2) octane (DABCO) and dipiperidyl ethane.

As indicated above, the polymers of the present invention are prepared by reacting a poly(dichlorophosphazene) polymer, a N-substituted amide or an active hydrogen containing imide, and compounds listed in the groups of "Additional Reactive Compounds" which may be substituted onto the poly(dichlorophosphazene) in the presence of a tertiary amine.

The specific reaction conditions and proportion of ingredients employed in preparing these polymers can vary somewhat depending on factors such as the reactivity of the specific N-substituted amide or imide utilized, the reactivity of the compound or compounds used to form copolymer substituents, the particular tertiary amine employed, and the degree of substitution desired in the finished polymer. In general, reaction temperatures can range from about 25° C. to about 200° C. and times can range from 3 hours up to 7 days; lower temperatures necessitating longer reaction times and higher temperatures allowing shorter reaction times. These conditions are, of course, utilized in order to obtain the most complete reaction possible, i.e., in order to insure the substantially complete conversion of the chlorine atoms in the polymer to the corresponding amido or imido linkage with active hydrogen-containing compounds as well as forming linkages with the copolymer substituents.

The above reaction is ordinarily carried out in the presence of a solvent. The solvent employed in the reaction should be a solvent for the poly(dichlorophosphazene) polymer, the active hydrogen-containing N-substituted amide, or imide, the compounds from which the copolymer substituents are derived, and the tertiary amine. Examples of suitable solvents which may be employed include diglyme, triglyme, tetraglyme, cyclohexane, chloroform, dioxane, dioxolane, methylene chloride, toluene, xylene and tetrahydrofuran. The amount of solvent employed is not critical and any amount sufficient to solubilize the reaction mixture materials can be employed. In addition, the materials in the reaction zone should be reasonably free of water. The prevention of substantial amounts of water in the reaction system is necessary in order to inhibit the reaction of the available chlorine atoms in the chloropolymer. Preferably the reaction mixture should contain less than about 0.01% water.

In general, the amount of the combined total of the N-substituted amido or imido compounds and the copolymer forming compounds employed in the process should be at least molecularly equivalent to the number of available chlorine atoms in the polymer mixture. However, preferably a slight excess of such compounds should be employed in order to insure complete displacement of all the available chlorine atoms.

While the N-substituted amido or imido containing poly(phosphazene) polymers of the present invention have been prepared in the above-identified manner, that is, in the presence of a tertiary amine, alternative methods of preparation are available. The prior art methods of poly(dichlorophosphazene) substitution such as the reaction with sodium alkoxide as demonstrated in U.S. Pat. No. 3,370,020 to Allcock et al may be used to substitute the N-substituted amido and imido containing groups which are derived from the active hydrogen containing N-substituted amides and imides respectively, and the substituents derived from the compounds listed in the list of additional reactive compounds.

The prior art methods may be used to substitute the above-identified substituents onto the poly(dichlorophosphazene) or may be used to partially substitute the poly(dichlorophosphazene) with groups other than N-substituted amido or imido groups whereas the remaining chlorines on the partially substituted poly(dichlorophosphazene) may be replaced with N-substituted amido or imido groups using the tertiary amine substitution process.

Where the presence of crosslinking functionality is desired, in a polymer otherwise free of unsaturated crosslinking functionality, crosslinking functionality can be introduced in the polymer molecule through the use of ethylenically unsaturated substituent groups in addition to the groups X and X' set forth above. Examples of suitable crosslinking moieties and methods for their cure are set forth in U.S. Pat. Nos. 4,055,520; 4,061,606; 4,073,824; 4,073,825; and 4,076,658 which are hereby incorporated by reference and include $-OCH=CH$ and $-OR_3CF_2$, as well as similar groups which contain unsaturation. Generally, when present, the moieties containing crosslinking functionality are usefully present in an amount between 0.1 mole % to about 50 mole % and usually between 0.5 mole % and about 10 mole % based on the replaceable chlorine in the starting poly(dichlorophosphazene).

The following examples are submitted for the purpose of further illustrating the nature of the present scope thereof. Parts and percentages referred to in the examples and throughout the specification are by weight unless otherwise indicated.

EXAMPLE 1

Preparation of $+(CF_3CH_2O)(CH_2(CH_4)CON)PN+$ Polymer

A bottle was charged with 11.6 gms (102.5 millimoles) of dry caprolactam, 4.4 gms. of a 50% dispersion of sodium in paraffin (2.25 gms, 97.6 millimoles), 120 cc of pentane, and 250 cc of dry tetrahydrofuran (hereinafter THF). The mixture was purged with nitrogen during agitation. After the sodium had reacted, the mixture was heated to 70° C. and the pentane-water azeotrope was removed by distillation. The remaining product was cooled and mixed with 45.4 cc (117 millimoles) of 2.58 M sodium trifluoroethoxide in a THF solution, 165.7 gms of a 6.76% solids THF solution of poly(dichlorophosphazene) (11.26 gms, 96.7 millimoles). After 20 hours at 80° C. the product was isolated by $CO_2$ addition, and subjected to salt removal with a 10% NaBr solution, centrifugation and coagulation in hexane. Analysis of the product for chlorine and sodium showed a chlorine content of 0.77% and a sodium content of 0.14%. The glass transition temperature ($T_g$) of the polymer product was $-26°$ C.

EXAMPLE 2

A bottle was charged with 5.0 gms (44 millimoles) of dry caprolactam, 3.2 cc (44 millimoles) of trifluoroethanol, 12.3 cc (88 millimoles) of triethylamine, 100 cc of THF, and a 33.9 percent solution of poly(dichlorophosphazene) (13.8 gms, 40.3 millimoles) in cyclohexane. The material in the bottle was heated at 120° C. for 20 hours. Coagulation in hexane yield 5.51 gms of a pink rubbery material which showed only a trace of PCl bonds at 600 cm$^{-1}$ in the IR spectrum and had the following elemental analysis:

|  | C | H | N | P | Cl |
|---|---|---|---|---|---|
| Actual (%) | 36.38 | 5.19 | 10.31 | 11.21 | 0.80 |
| Calculated (%)* | 36.40 | 4.78 | 10.48 | 11.16 | 0.88 |

*Based on 3.43% triethylamine . HCl, 0.27% hydrolyzed chloropolymer, 42.64% $CF_3CH_2OH$ derivative and 48.92% lactam derivative.

EXAMPLE 3

A bottle was charged with 8.68 gms (44 millimoles) of benzanilide, 3.2 cc (44 millimoles) of trifluoroethanol, 12.3 cc (88 millimoles) of triethylamine, 100 cc of THF, and 13.8 gms (40.3 millimoles) of a 33.9 percent solution of poly(dichlorophosphazene) in cyclohexane. The material in the bottle was heated at 120° C. for a period of 20 hours. Coagulation in hexane yielded 9.65 gms of a white powder which showed only a trace of PCl bonds at 600 cm$^{-1}$ in the IR spectrum.

EXAMPLE 4

A bottle was charged with 8.06 gms (44 millimoles) of saccharin, 3.2 cc (44 millimoles) of trifluoroethanol, 12.3 cc (88 millimoles) of triethylamine, 100 cc of THF, and 35.9 gms (39.9 millimoles) of a 12.85 percent solution of poly(dichlorophosphazene) in THF. The materials in the bottle were heated at 80° C. for 68 hours to yield 8.6 gms of an elastomeric cream colored rubbery material with a $T_g$ of $-60°$ C. and a $T_m$ of 169° C. The rubbery material was insoluble in both THF and methanol and was determined to have the following elemental analysis:

| | C | H | N | P | Cl | S |
|---|---|---|---|---|---|---|
| Actual (%) | 29.17 | 7.11 | 10.21 | 11.56 | 5.04 | 3.22 |
| Calculated (%)* | 29.30 | 4.15 | 10.33 | 11.70 | 6.08 | 3.01 |

*Based on a composition of 23.7% triethylamine . HCl, 20.6% hydrolyzed chloropolymer, 5.7% CH₃CH₂OH derivative and 38.4% saccharin derivative.

EXAMPLE 5

A bottle was charged with 6.47 gms (44 millimoles) of phthalimide, 3.2 cc (44 millimoles) of trifluoroethanol, 12.3 cc (88 millimoles) of triethylamine, 100 cc of THF, and 40.1 gms (40.1 millimoles) of a 11.6% solution of polydichlorophosphazene in THF. The material in the bottle was heated at 120° C. for 68 hours. Coagulation in methanol yielded 7.76 gms of an orange plastic material which showed no PCl bonds at 600 cm$^{-1}$ in the IR spectrum. The reaction mixture was observed to have IR bands at 560, 550 and 532 cm$^{-1}$.

| | C | H | N | P | Cl |
|---|---|---|---|---|---|
| Actual (%) | 36.90 | 3.54 | 9.12 | 11.16 | 1.31 |
| Calculated (%)* | 36.84 | 2.65 | 9.07 | 11.25 | 1.66 |

*Based on a composition of 6.5% triethylamine . HCl, 1.7% hydrolyzed chloropolymer, 54.1% CH₃CH₂OH derivative and 39.9% phthalimide derivative

We claim:

1. A polyphosphazene copolymer containing units represented by the formulas:

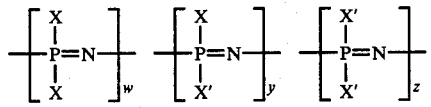

wherein X is

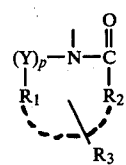

in which Y is selected from the group consisting of

and —SO₂— and p=0 or 1; when p=0, R₁ and R₂ are independently selected from a group consisting of substituted or unsubstituted aliphatic, aryl, araryl, and alkylaryl radicals or R₁ and R₂ can form a linkage in a cyclic amide containing radical wherein R₁ and R₂ taken together are $+CH_2)_n$ where n=2 to 12, wherein R₃ is a lower alkyl radical or hydrogen; and when p=1, R₁ and R₂ taken together form a linkage in a cyclic imide containing radical selected from a group consisting of $+CH_2)_{n'}$ where n'=2 to 3 and

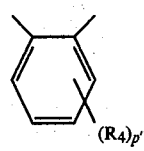

R₄ is selected from a group consisting of hydrogen, halogen and alkyl radical containing 1 to 6 carbon atoms; and p' is 0 to 4, X' is selected from a group consisting of substituted or unsubstituted alkoxy, aryloxy, amino or mercapto substituent group or mixtures thereof; 20≦(w+y+z)≦50,000 per polymer and (y+z)>0.

2. The polymer of claim 1 wherein X in the units of polymer is

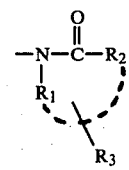

in which R₁ and R₂ are independently selected from a group consisting of substituted or unsubstituted aliphatic, cycloaliphatic, aryl, araryl, alkylaryl and heterocyclic radicals or R₁ and R₂ together form a cyclic amide containing ring wherein R₁ and R₂ taken together are $+CH_2)_n$ where n=2 to 12, R₃ is selected from the group consisting of hydrogen and lower alkyl, wherein the X' substituent of said units is selected from the group consisting of substituted and unsubstituted alkoxy, aryloxy, amino and mercapto groups and mixtures thereof and wherein the copolymer units are randomly distributed and X and X' are independently selected for each copolymer unit.

3. The polymer of claim 2 wherein X is derived from a group consisting of caprolactam and N-phenylacetamide and X' is derived from a group consisting of trifluoroethanol and 4-chlorophenol.

4. The polymer of claim 1 wherein X is derived from saccharin and X' is derived from trifluoroethanol.

5. The polymer of claim 1 wherein X is derived from phthalimide and X' is derived from trifluoroethanol.

6. A method of preparing polyphosphazene polymers containing units represented by the formulas:

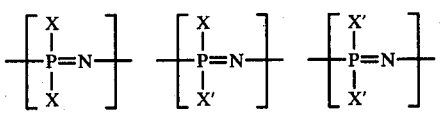

wherein X is

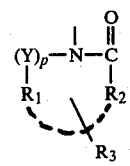

in which Y is selected from the group consisting of

and —$SO_2$— and p=0 to 1; when p=0, $R_1$ and $R_2$ are independently selected from a group consisting of substituted or unsubstituted aliphatic, aryl, araryl, and alkylaryl radicals or $R_1$ and $R_2$ can form a linkage in a cyclic amide containing radical wherein $R_1$ and $R_2$ taken together are $-(CH_2)_n-$ where n=2 to 12, wherein $R_3$ is a lower alkyl radical or hydrogen; and when p=1, $R_1$ and $R_2$ taken together form a linkage in a cyclic amide containing radical selected from a group consisting of $-(CH_2)_{n'}-$ wherein n'=2 or 3 and

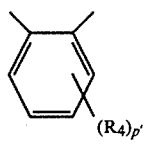

and $R_4$ is selected from a group consisting of hydrogen, halogen and alkyl radical containing 1 to 6 carbon atoms; and p' is 0 to 4, X' is selected from a group consisting of substituted or unsubstituted alkoxy, aryloxy, amino or mercapto substituent group or mixtures thereof; reacting a poly(dichlorophosphazene) polymer having the formula —$(NPCl_2)_{n'}$—, wherein n' is from 20 to 50,000, with a mixture consisting of a compound selected from a group consisting of an N-substituted amide and a cyclic imide, and a substituted or unsubstituted alkanol, aryl alcohol, amine, mercaptan or mixture thereof, in the presence of a tertiary amine.

7. The method of claim 6 wherein the N-substituted amide is selected from a group consisting of caprolactam and N-phenylacetamide.

8. The method of calim 6 wherein the mixture consists of an N-substituted amide selected from the group consisting of caprolactam and N-phenylacetamido with a compound selected from the group consisting of trifluoroethanol and 4-chlorophenol.

9. The method of claim 6 wherein the cyclic imide is selected from the group consisting of saccharin and phthalimide.

10. The method of claim 6 wherein the tertiary amine is triethylamine.

* * * * *

UNITED STATES PATENT AND TRADEMARK OFFICE
CERTIFICATE OF CORRECTION

PATENT NO. : 4,218,557
DATED : August 19, 1980
INVENTOR(S) : William L. Hergenrother and Adel F. Halasa It is certified that error appears in the above-identified patent and that said Letters Patent are hereby corrected as shown below:

Column 1, line 63, the formulae:

the last formula should read

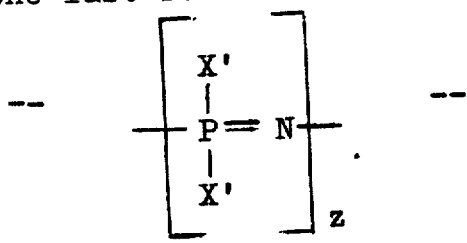

Column 6, Claim 6, line 14

"amide" should read -- imide --

Signed and Sealed this

Ninth Day of December 1980

[SEAL]

Attest:

SIDNEY A. DIAMOND

Attesting Officer

Commissioner of Patents and Trademarks